(12) United States Patent
Kummeth et al.

(10) Patent No.: US 9,252,635 B2
(45) Date of Patent: Feb. 2, 2016

(54) ROTOR FOR AN ELECTRIC MACHINE AND ELECTRIC MACHINE

(75) Inventors: Peter Kummeth, Herzogenaurach (DE); Heinz Schmidt, Möhrendorf (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 176 days.

(21) Appl. No.: 14/124,454

(22) PCT Filed: May 24, 2012

(86) PCT No.: PCT/EP2012/059673
§ 371 (c)(1),
(2), (4) Date: Dec. 6, 2013

(87) PCT Pub. No.: WO2012/168082
PCT Pub. Date: Dec. 13, 2012

(65) Prior Publication Data
US 2014/0100115 A1    Apr. 10, 2014

(30) Foreign Application Priority Data
Jun. 7, 2011    (DE) .......................... 10 2011 077 054

(51) Int. Cl.
*H02K 1/32*    (2006.01)
*H02K 55/00*    (2006.01)
*H02K 1/28*    (2006.01)

(52) U.S. Cl.
CPC ................. *H02K 1/28* (2013.01); *H02K 55/00* (2013.01); *Y02E 40/62* (2013.01)

(58) Field of Classification Search
CPC ............. H02K 55/00–55/04; H01K 1/28–1/32
See application file for complete search history.

(56) References Cited

U.S. PATENT DOCUMENTS 4,987,674 A    1/1991    Denk

FOREIGN PATENT DOCUMENTS

| DE | 1816300 A1 | 7/1970 |
|---|---|---|
| DE | 3527714 C2 | 12/1992 |
| FR | 2392527 A1 | 12/1978 |
| JP | 1006326 A | 1/1989 |
| JP | 1146212 A | 6/1989 |
| SU | 1470145 A1 | 11/1988 |
| WO | WO 0049703 A1 | 8/2000 |
| WO | WO 0108173 A1 | 2/2001 |
| WO | WO 03065767 A2 | 8/2003 |
| WO | WO 2007116519 A1 | 10/2007 |

*Primary Examiner* — Colleen Dunn
(74) *Attorney, Agent, or Firm* — Henry M. Feiereisen LLC

(57) ABSTRACT

A rotor for an electric machine includes a pole core having a coolable magnetisable rotor section which is made of a superconducting material. The rotor section has a rotationally symmetric geometry. The pole core is formed as a cylinder and the rotor section is arranged on an outer surface of the cylinder so as to be encircling.

18 Claims, 2 Drawing Sheets

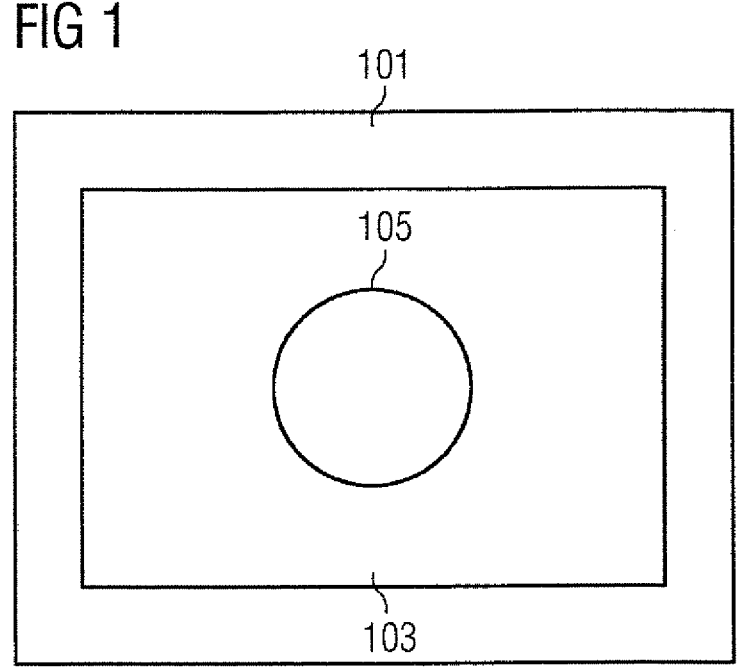
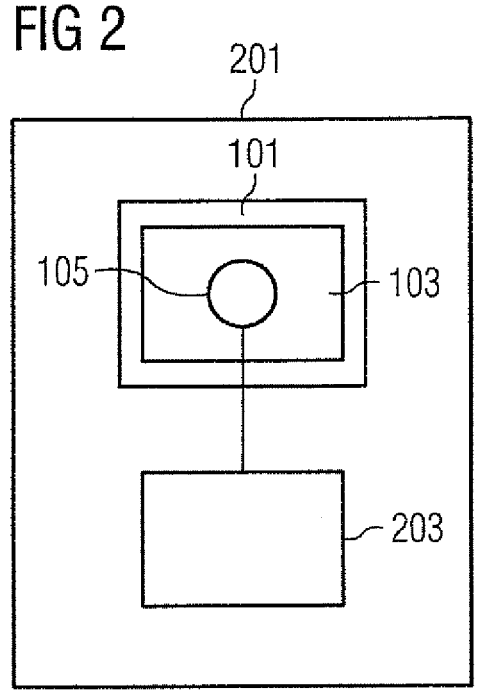

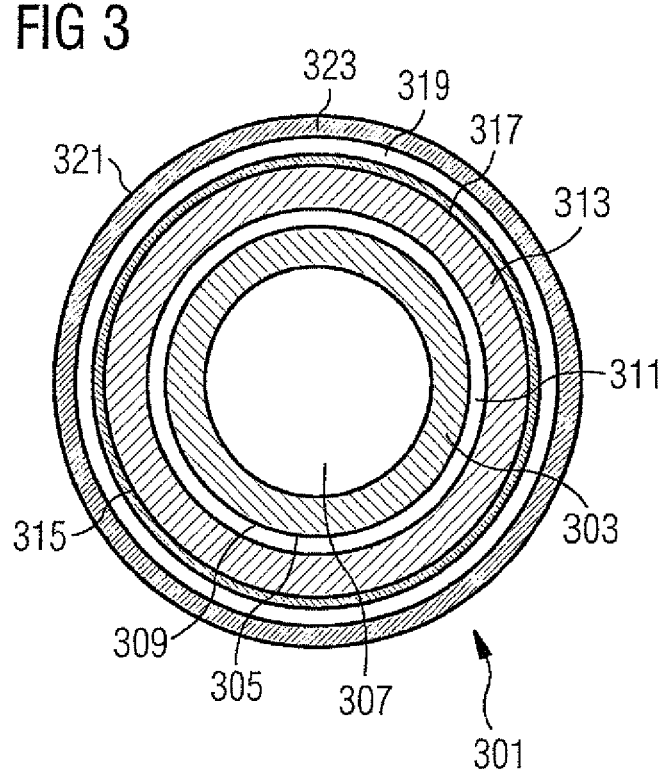

ROTOR FOR AN ELECTRIC MACHINE AND ELECTRIC MACHINE

CROSS-REFERENCES TO RELATED APPLICATIONS

This application is the U.S. National Stage of International Application No. PCT/EP2012/059673, filed May 24, 2012, which designated the United States and has been published as International Publication No. WO 2012/168082 and which claims the priority of German Patent Application, Serial No. 10 2011 077 054.2, filed Jun. 7, 2011, pursuant to 35 U.S.C. 119(a)-(d).

BACKGROUND OF THE INVENTION

The invention relates to a rotor for an electric machine and to an electric machine.

The rotor of a synchronization machine typically has a ferromagnetic pole core which has a complex shape and therefore causes high production costs and high technical production complexity. The shape of the pole core is conventionally determined by the number of poles of the rotor. The pole core of a rotor is configured in this respect for exactly the number of poles. The space between the poles does not, as a rule, contribute to the torque.

SUMMARY OF THE INVENTION

The object underlying the invention can therefore be seen in disclosing a rotor having a pole core which can be universally used in electric machines with different numbers of poles.

The object underlying the invention can also be seen in disclosing an electric machine having such a rotor, it being possible to universally change a pole number.

These objects are achieved by means of the respective subject matter of the independent claims. Advantageous embodiments are the subject matter of dependent subclaims respectively.

According to one aspect a rotor for an electric machine is provided. The rotor comprises a pole core which has a coolable magnetisable rotor section made of a super-conducting material. The rotor section has a rotationally symmetric geometry.

According to a further aspect an electric machine is created. The electric machine comprises a rotor having a pole core which has a coolable magnetisable rotor section made of a super-conducting material. The rotor section has a rotationally symmetric geometry. A magnetizing device is also provided which is designed to induce a magnetic flux through the super-conducting material.

The invention therefore includes the idea of providing a rotor section of a pole core made from a super-conducting material. A magnetic flux can be induced through the super-conducting material by means of the magnetizing device. In this respect a magnetic flux forms through the super-conducting material. The rotor section is therefore magnetized. Since the rotor section is coolable, the super-conducting material can advantageously be cooled to a temperature below the critical temperature of the super-conducting material. This cooling advantageously causes the magnetic flux to be anchored in the super-conducting material. The magnetic flux is frozen so to speak. The anchoring can in particular also be called pinning. In this respect the rotor section can in particular advantageously form a pole of a magnetic field. The critical temperature can also be called a transition temperature and is in particular the temperature at which the electrical resistance of the super-conducting material drops to zero Ohm if it is not attained.

Even if the magnetizing device is now switched off, so it can no longer induce a magnetic flux in the super-conducting material, the anchored magnetic flux is retained in the super-conducting material. The rotor section has therefore been advantageously magnetized.

Due to the rotationally symmetric geometry of the rotor section the magnetic flux or the corresponding magnetic field does not depend on the geometry of the rotor section but may advantageously be predefined free of the magnetizing device. The rotor magnetic field which forms, with a specific pole number, can be freely adjusted in this respect, since, due to its rotational symmetry, the rotor section has a geometry independent of pole number.

A rotationally symmetric rotor section within the meaning of the present invention means in particular that rotation about an axis over any desired angle, in particular about an axis of symmetry, maps the rotor section onto itself. A rotor section with a rotationally symmetric geometry in particular also has a spherical symmetric or a cylinder symmetric geometry. The rotor section can by way of example be formed as a rotational body. A rotational body within the meaning of the present invention is in particular a body which is formed by rotation of a generating curve about an axis of rotation. The curve and the axis are located in one plane in this connection.

The rotor can in particular also be called an armature. The super-conducting material can in particular also be called a bulk superconductor. One section can in particular also be called a region and in particular identifies a physically connected area.

According to one embodiment the electric machine can in particular be formed as a synchronous machine.

According to one embodiment the pole core is formed from a magnetic material, in particular iron and/or $X_8Ni_9$, or a non-magnetic or unmagnetic material or a combination hereof. The pole core can in particular also include copper as a material. The provision of a magnetic material advantageously causes in particular a basic magnetic field to be produced on which a further magnetic field is then impressed by means of the magnetizable rotor section. The pole core is in particular formed from a metal or includes a metal. The pole core can by way of example also be formed from aluminum or an aluminum alloy. In the case of a pole core made from copper, it can preferably be provided that the pole core is arranged in a ferromagnetic casing. Further elements, by way of example, such as coupling layer, heater, super-conducting material, are then arranged on this casing.

According to one embodiment the pole core is formed as a cylinder, wherein the rotor section is arranged on an outer surface, also called a circumferential surface, of the cylinder so as to be encircling. "Cylinder" is here intended to mean in particular a straight circular cylinder, also called a rotary cylinder, which is formed by way of example by shifting a circle through a straight line running through the center of the circle and which is perpendicular to the plane of the circle. A cross-section of the straight circular cylinder perpendicular to the straight line therefore has a circular shape. The provision of such a cylinder as the pole core, wherein the rotor section is arranged on an outer surface or circumferential surface of the cylinder so as to be encircling, has the advantage in particular that a rotational body of this kind is particularly easy to produce and process. The rotor section can in particular be arranged on the entire outer surface of the cylinder, and this makes particularly efficient use of the outer surface and can also produce a physically extended magnetic field. In particular optimum use of the available area is made with respect to high torque of the electric machine. The outer surface can therefore in particular be completely covered by the rotor section. It can preferably also be provided that the rotor section is only arranged on one or more section(s) of the outer surface. The outer surface is therefore in particular only partially covered by the rotor section. Super-conducting material is advantageously saved with a partial covering.

According to one embodiment the cylinder is formed as a hollow cylinder, so a coolant, by way of example liquid nitrogen, liquid neon or liquid helium, can be introduced into an interior of the hollow cylinder to advantageously cool the pole core and therewith the super-conducting material as well. This type of cooling has the advantage in particular that it is easy to implement. The coolant is, moreover, in direct contact with the cylinder, and this causes fast, effective and efficient cooling. A coolant within the meaning of the present invention can in particular be a cooling gas or a cooling liquid.

According to a further embodiment it may be provided that a thermal coupling layer is formed between the rotor section and the outer surface. A precisely defined thermal coupling of the super-conducting material to the pole core is advantageously enabled therefore. The thermal coupling layer preferably has a predetermined thermal conductivity, so transfer of thermal energy between pole core and rotor section can be precisely adjusted. The rotor section can by way of example be thermally weakly coupled to the pole core. This means, in particular, that heating of the super-conducting material does not lead, or scarcely leads, to heating of the pole core. It may by way of example be provided that the thermal coupling layer comprises a thermal diode, which allows a transfer of thermal energy in substantially only one direction. A thermal diode of this kind may be by way of example a diamond.

According to one embodiment the thermal coupling layer comprises glass fibers. Compared to copper glass has by way of example very low thermal conductivity, so weak thermal coupling can advantageously be induced as a result. Glass fibers also have the advantage that, as a rule, they are resistant to ageing and weathering, are chemically resistant and noncombustible, so a reliable and durably stable thermal coupling layer is formed.

In a further embodiment it may be provided that the thermal coupling layer is formed from a glass fiber bandage. A glass fiber bandage of this kind can be wound by way of example around the cylinder, by way of example wound wet. This means in particular that the glass fiber bandage is wound in the wet state, by way of example with epoxy resin, and can then cure. In particular it may be provided that the glass fiber bandage is glued to the outer surface by means of an epoxy resin adhesive. The glass fiber bandage has in particular a defined thickness. The formation of a thermal coupling layer by means of winding of a glass fiber bandage has the advantage in particular that it can be applied to the cylinder securely and with good thermal contact with the outer surface of the cylinder.

In a further embodiment the super-conducting material has a protective layer against a centrifugal force formed during a rotation of the pole core. The super-conducting material is consequently advantageously protected against the forces that occur during rotation. A wet-wound glass bandage or glass fiber bandage by way of example can be provided as the protective layer. This is wound around the super-conducting material in particular in the wet state, by way of example with epoxy resin, and cures, so a stable secure arrangement is achieved.

In yet a further embodiment it may be provided that the rotor section is formed from one or more super-conducting tile(s). The tiles can by way of example be glued, in particular by means of an epoxy resin adhesive. A tile can have a rectangular shape by way of example and be by way of example about 4 cm or about 5 cm long and about 4 cm or about 5 cm wide. The tiles can be the same or different. The exact dimensions depend in particular on the geometry of the rotor core, so the above dimensions should be understood as merely exemplary but not limiting. Super-conducting tiles of this kind have the advantage in particular that easy attachment of super-conducting materials to the pole core, by way of example the outer surface of the cylinder, is possible. Furthermore, a single tile can be easily replaced, by way of example in the event of damage, without all of the super-conducting material having to be replaced in the process.

According to a further embodiment a heater is arranged on the super-conducting material, and this can heat the super-conducting material at least to a temperature above the critical temperature. It is therefore advantageously possible in particular for a rotor section already cooled to below the critical temperature to be sufficiently heated again to the extent that penetration of magnetic flux through the super-conducting material is enabled, so a corresponding rotor magnetic field is formed as a result. The rotor magnetic field can therefore by way of example advantageously be replaced or changed even during operation of the electric machine, wherein a rotation of the rotor in particular is stopped for this purpose. A pole number of the machine may also be subsequently changed, moreover.

According to one embodiment the heater can be formed as a heating foil which is glued to the super-conducting material, by way of example by means of an epoxy resin adhesive. The provision of a heating foil has the advantage in particular that even a large surface of the super-conducting material can easily be heated thereby.

In one embodiment the magnetizing device has at least one magnetizing coil which can be energized by means of an electrical current. A magnetizing coil of this kind can be arranged by way of example in the rotor; a winding of such a coil can be wound by way of example around the super-conducting material and/or the cylinder. The magnetizing coil can, however, also be arranged externally from the rotor. The provision of a magnetizing coil has the advantage in particular that a magnetic flux can be produced through the super-conducting material irrespective of operation of the electric machine since, during operation of the electric machine, individual coils of the machine cannot, as a rule, be used for this.

According to a further embodiment the magnetizing device comprises a stator winding of a stator. The magnetizing device can in particular comprise a plurality of stator windings. The stator can in particular also be called an inductor. An existing winding of a stator, which in particular can be generally encompassed by the electric machine, is therefore advantageously used to induce a magnetic flux in the super-conducting material. In this case further, additional magnetizing coils by way of example can be omitted, and this reduces costs and technical production complexity. The stator can in particular comprise a plurality of windings which can be energized individually or jointly. The stator windings can be formed by way of example from a super-conducting material, so particularly low-loss operation of the electric machine is enabled with appropriate cooling of the windings below the transition temperature.

In a further embodiment a DC current source may be provided for energizing the stator, in particular the windings, and/or for energizing the magnetizing coil. DC stands here for "Direct Current".

According to one embodiment the super-conducting material can be a high-temperature super-conducting (HT$_c$S) material by way of example, wherein T$_c$ stands for the critical temperature. Just HTS will also be used below for HT$_c$S. The super-conducting material can be by way of example YBa$_2$Cu$_3$O$_7$, Bi$_2$Sr$_2$CaCuO$_8$, (BiPb)$_2$Sr$_2$Ca$_2$Cu$_3$O$_{10}$, SmBaCuO, GdBaCuO, YBaCuO or magnesium diboride. In the case of an HTS material the critical temperature can be equal to or greater than 23 K by way of example.

In a further embodiment a plurality of rotor sections may also be formed from a super-conducting material. The rotor sections are by way of example identical or different.

According to a further embodiment it may be provided that the rotor is arranged in a cryostat for thermal insulation. Particularly efficient and economical cooling of the rotor can therefore advantageously be achieved. In particular the cryostat can be evacuated. The cryostat is preferably formed as part of the rotor or is encompassed thereby, so it can co-rotate with the rotor.

BRIEF DESCRIPTION OF THE DRAWING

The above-described properties, features and advantages of this invention and the manner in which they are attained will become clearer and better understood in conjunction with the following description of the exemplary embodiments which are explained in more detail in conjunction with the drawings, in which:

FIG. 1 shows a rotor,
FIG. 2 shows an electric machine, and
FIG. 3 shows a sectional view through a further rotor.

DETAILED DESCRIPTION OF PREFERRED EMBODIMENTS

Identical reference numerals will be used below for identical features.

FIG. 1 shows a rotor 101 for an electric machine (not shown). The rotor 101 comprises a pole core 103 which comprises a coolable magnetizable rotor section 105 made from a super-conducting material and which has a rotationally symmetric geometry. The rotor section 105 can also be called a rotationally symmetric rotor section in this respect. The rotationally symmetric geometry of the rotor section 105 is shown in FIG. 1 by means of a circle, wherein this should only be understood as being exemplary and not limiting. The rotor section can by way of example be formed on an outer surface of a straight circular cylinder, in particular hollow cylinder, so as to encircle the circumferential surface, wherein the circular cylinder forms the pole core in particular.

FIG. 2 shows an electric machine 201 comprising the rotor 101 from FIG. 1. The electric machine 201 also has a magnetizing device 203 which can induce a magnetic flux in the super-conducting material of the rotor section 105, so the rotor section 105 is advantageously magnetized.

The rotor section 105 is preferably heated, if necessary, to a temperature above the critical temperature of the super-conducting material for this purpose. The magnetizing device 203 then induces a magnetic flux in or through the super-conducting material. Once a magnetic flux has formed in or through the super-conducting material, the rotor section 105 is cooled to a temperature below the critical temperature, and this advantageously causes the magnetic flux to be anchored in the super-conducting material. The magnetic flux is frozen so to speak. This means in particular therefore that even when the magnetizing device 203 is switched off, the magnetic flux and therefore the correspondingly formed rotor magnetic field are retained.

Due to the rotational symmetry of the rotor section 105 the rotor magnetic field thus anchored has a field profile, and this does not depend on the geometry of the rotor section 105. In this respect the magnetizing device 203 can advantageously freely predefine a specific field profile. A specific pole number can also be advantageously adjusted as a result.

In an embodiment which is not shown the electric machine 201 comprises a stator with one or more stator winding(s), wherein the magnetizing device energizes at least one of the stator windings to induce the magnetic flux in the super-conducting material. A DC current source is preferably provided to energize the stator windings.

FIG. 3 shows a sectional view through a rotor 301 for an electric motor (not shown). The rotor 301 comprises a pole core 303 formed from a hollow cylinder 305. The hollow cylinder 305 has a cavity 307 or interior which can in particular receive a coolant, by way of example liquid neon, liquid nitrogen or liquid helium, to cool the hollow cylinder 305. A glass fiber bandage 311 wet-wound with epoxy resin adhesive is provided on an outer surface 309 or circumferential surface of the hollow cylinder 305. A super-conducting material is secured to the glass fiber bandage 311, by way of example by means of an epoxy resin adhesive. The glass fiber bandage 311 causes a defined, weak thermal coupling of the super-conducting material 313 to the pole core 303. The super-conducting material 313 forms a rotor section.

According to an embodiment which is not shown it may be provided that the super-conducting material 313 is applied to the glass fiber bandage 311 as super-conducting tiles.

The entire circumferential surface 309 of the hollow cylinder 305 is covered with the super-conducting material 313, in particular the tiles, in the rotor 301, so optimum use of the available area is advantageously made with respect to large torques of the electric machine.

In an embodiment which is not shown it may also be provided that the circumferential surface 309 of the hollow cylinder 305 is only partially covered by the super-conducting material 313, in particular the tiles, whereby super-conducting material can advantageously be saved. It is only important that the super-conducting material is formed around the circumferential surface 309 so as to be encircling, so the rotor section formed by means of the super-conducting material 313 has a rotationally symmetric geometry.

Arranged on a side 315 of the super-conducting material 313 remote from the glass fiber bandage 311 is a heater 317 which is preferably formed as a heating foil. The heater 317 is glued to the side 315, by way of example by means of an epoxy resin adhesive.

Around this assembly is arranged a wet-wound glass bandage 319 which advantageously protects against a rotational force which occurs during rotation.

A cryostat 321 with a double-walled evacuated wall 323 is formed for thermal insulation of the rotor 301, wherein the rotor 301 is arranged in the cryostat 321. In an embodiment which is not shown the cryostat can also have just a single-walled wall, wherein a space is then preferably evacuated between the rotor 301 and the wall of the cryostat. In a further embodiment which is not shown the single-walled or double-walled wall of the cryostat can be metallic or formed from a metal material. Eddy current losses consequently advantageously occur in the rotating cryostat and not in the super-conducting material 313.

In an embodiment which is not shown the hollow cylinder 305 is formed as a metal hollow cylinder, so eddy current losses advantageously occur in a metal wall of the hollow cylinder and not in the super-conducting material 313. The hollow cylinder 305 can preferably be formed from copper, and this enables particularly efficient and effective cooling owing to the good thermal conductivity of copper. In the case of a hollow cylinder made of copper it may preferably be provided that this is arranged in a ferromagnetic casing on which the glass fiber bandage 311 in particular and the further elements of the rotor 301 are then arranged or provided.

To summarise, the invention in particular includes the idea of providing a rotor with a geometry independent of pole number, and this is achieved in particular by a rotationally symmetric arrangement of the super-conducting material. In particular the pole core can be a hollow cylinder, wherein the circumferential surface of the hollow cylinder is covered by the super-conducting material, in particular in the form of super-conducting tiles. This universal rotor construction therefore advantageously allows the use of the rotor in electric machines with different pole numbers.

The production complexity is also reduced as a result, and this means higher piece numbers, and this ultimately leads to much reduced production costs.

The low space requirement for the poles of the rotor advantageously allows the construction of particularly narrow rotors. Higher rotational speeds can in particular advantageously be attained as a result.

The mechanical stabilization of the rotor for operation at high rotational speeds can be easily and inexpensively achieved in particular by a cylinder shape or cylindrical shape.

With magnetization of the rotor section by means of windings, which are arranged outside of the rotor, cooling of the rotor is considerably simplified compared to rotors which have to be magnetized by means of an additional coil or which are provided with HTS coils, i.e. coils made from an HTS material, for magnetization, since no such additional coils have to be cooled (with potential risk of quenching). There are no corresponding power supply lines either which have to be thermally quenched and cooled.

Optimum use of the available area is made with respect to a torque of the electric machine which is as large as possible in particular if the entire circumferential surface of the hollow cylindrical pole core is covered with a super-conducting material, in particular super-conducting tiles.

During magnetization of the rotor section, the section can be in any desired position owing to its rotational symmetry, in particular a cylinder symmetry. Exact and, in this respect, complex positioning is omitted since no pole positions are predetermined by the geometric form of the rotor section.

Although the invention has been illustrated and described in detail by the preferred exemplary embodiments, it is not limited by the disclosed examples and a person skilled in the art can derive other variations herefrom without departing from the scope of the invention.

What is claimed is:

1. A rotor for an electric machine, comprising a pole core having a coolable magnetisable rotor section made of super-conducting material and having a rotationally symmetric geometry, said pole core being formed as a cylinder, with the rotor section arranged in surrounding relation to an outer surface of the cylinder, said cylinder being formed as a hollow cylinder configured for introduction of a coolant into an interior of the hollow cylinder.

2. The rotor of claim 1, further comprising a thermal coupling layer formed between the rotor section and the outer surface of the cylinder.

3. The rotor of claim 2, wherein the thermal coupling layer includes glass fibers.

4. The rotor of claim 2, wherein the thermal coupling layer is formed from a glass fiber bandage.

5. The rotor of claim 1, wherein the super-conducting material has a protective layer against a centrifugal force formed during a rotation of the pole core.

6. The rotor of claim 5, wherein the protective layer is formed as a glass bandage.

7. The rotor of claim 1, wherein the rotor section is formed from at least one super-conducting tile.

8. The rotor of claim 1, further comprising a heater arranged on the super-conducting material to heat the super-conducting material to a temperature above a critical temperature.

9. An electric machine, comprising:
   a rotor including a pole core having a coolable magnetisable rotor section made of super-conducting material and having a rotationally symmetric geometry, said pole core being formed as a cylinder, with the rotor section arranged in surrounding relation to an outer surface of the cylinder, said cylinder being formed as a hollow cylinder configured for introduction of a coolant into an interior of the hollow cylinder; and
   a magnetizing device for inducing a magnetic flux through the super-conducting material.

10. The electric machine of claim 9, wherein the rotor includes a thermal coupling layer which is formed between the rotor section and the outer surface of the cylinder.

11. The electric machine of claim 10, wherein the thermal coupling layer includes glass fibers.

12. The electric machine of claim 10, wherein the thermal coupling layer is formed from a glass fiber bandage.

13. The electric machine of claim 9, wherein the super-conducting material has a protective layer against a centrifugal force formed during a rotation of the pole core.

14. The electric machine of claim 13, wherein the protective layer is formed as a glass bandage.

15. The electric machine of claim 9, wherein the rotor section is formed from at least one super-conducting tile.

16. The electric machine of claim 9, wherein the rotor includes a heater arranged on the super-conducting material to heat the super-conducting material to a temperature above a critical temperature.

17. The electric machine of claim 9, wherein the magnetizing device includes at least one magnetizing coil energized by electrical current.

18. The electric machine of claim 9, wherein the magnetizing device includes at least one stator winding.

\* \* \* \* \*